United States Patent
Li

(10) Patent No.: US 9,863,756 B1
(45) Date of Patent: Jan. 9, 2018

(54) LINE SCAN SPECTROSCOPIC WHITE LIGHT INTERFEROMETRY FOR SEMICONDUCTOR INSPECTION AND METROLOGY

(71) Applicant: KLA-TENCOR CORPORATION, Milpitas, CA (US)

(72) Inventor: Shifang Li, Pleasanton, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 161 days.

(21) Appl. No.: 14/877,882

(22) Filed: Oct. 7, 2015

Related U.S. Application Data

(60) Provisional application No. 62/061,039, filed on Oct. 7, 2014.

(51) Int. Cl.
*G01B 11/02* (2006.01)
*G01B 11/06* (2006.01)
*G01J 3/45* (2006.01)
*G01J 3/02* (2006.01)
*G01J 3/18* (2006.01)

(52) U.S. Cl.
CPC ........ *G01B 11/0608* (2013.01); *G01J 3/0208* (2013.01); *G01J 3/1838* (2013.01); *G01J 3/45* (2013.01)

(58) Field of Classification Search
CPC ............. G01B 11/0608; G01B 11/2441; G01J 3/0208; G01J 3/1838; G01J 3/45; G01J 2003/451
See application file for complete search history.

(56) References Cited

U.S. PATENT DOCUMENTS

| | | | | |
|---|---|---|---|---|
| 4,060,326 A | * | 11/1977 | Tirabassi | G01J 3/0229 356/328 |
| 7,468,799 B2 | * | 12/2008 | de Groot | G01B 11/0675 356/497 |
| 7,924,434 B2 | * | 4/2011 | Hwang | G01N 21/45 356/511 |
| 8,780,334 B1 | * | 7/2014 | De Groot | G01B 9/02076 356/28.5 |
| 2005/0280817 A1 | * | 12/2005 | Horchner | G01J 3/2803 356/318 |

(Continued)

FOREIGN PATENT DOCUMENTS

EP 0322654 A2 * 7/1989 ................ G01J 3/02

*Primary Examiner* — Michael A Lyons
(74) *Attorney, Agent, or Firm* — Hodgson Russ LLP

(57) ABSTRACT

A device and method for surface height profiling are presented. The device has a source with a source slit through which light is provided. The device includes an objective lens having a reference surface. The objective lens is configured to illuminate a sample with test light from the source and to combine test light reflected from the sample with reference light reflected from the reference surface to form combined light. A spectrometer is positioned to receive the combined light at an entrance slit. The spectrometer is configured to image the combined light as a 2D image with a wavelength dimension and a spatial position dimension. A processor in electrical communication with the spectrometer is programmed to receive a signal representing the 2D image and to determine a surface height profile of the sample based on the signal.

13 Claims, 4 Drawing Sheets

(56) References Cited

U.S. PATENT DOCUMENTS

| | | | |
|---|---|---|---|
| 2011/0032534 A1* | 2/2011 | Malinovich | G01B 11/24 |
| | | | 356/498 |
| 2014/0104623 A1* | 4/2014 | Tsujii | G01J 3/0291 |
| | | | 356/614 |
| 2015/0106057 A1* | 4/2015 | Sugita | G01B 11/0608 |
| | | | 702/167 |

* cited by examiner

LINE SCAN SPECTROSCOPIC WHITE LIGHT INTERFEROMETRY FOR SEMICONDUCTOR INSPECTION AND METROLOGY

CROSS-REFERENCE TO RELATED APPLICATIONS

This application claims priority to U.S. Provisional Application No. 62/061,039, filed on Oct. 7, 2014, the disclosure of which is incorporated herein by reference.

FIELD OF THE DISCLOSURE

The disclosure relates to semiconductor wafer inspection and metrology.

BACKGROUND OF THE DISCLOSURE 3-dimensional ("3D") inspection and/or metrology of silicon wafers are required processes in the semiconductor industry. Such inspection can be used, for example, to test the through silicon via ("TSV") and bump structure or the particle shape (e.g., size and height). Typical techniques for inspection or metrology include: (1) triangulation; (2) geometric shadow; (3) various confocal microscope techniques; and (4) white-light (or broadband light) interferometry. Triangulation and geometric shadow techniques are not precise enough for contemporary back-end of line ("BEOL") applications. Confocal microscopy and interferometry techniques typically fail to meet throughput requirements.

White-light interferometry is known to be a high-resolution method for 3D inspection and metrology and has been used in the semiconductor industry. There are two types of such devices offering in the market: (1) scanning white-light interferometers ("SWI"); and (2) spectroscopic white-light interferometers. In SWI devices, either the sample (e.g., the wafer under inspection) or the inspection optics scan along a direction perpendicular to the wafer surface, the z-direction, for a distance. Multiple frames are taken at specific z-values to determine the height measurement for a specific x-y location on the wafer surface. Such SWI devices are robust but generally slow. Furthermore, this technique requires the sample to move to field of view and stabilized before a measurement is taken—another factor limiting its speed.

In spectrographic devices, reflected light is detected with a spectrometer without the need for mechanical scanning in the z-direction. Such devices are constructed as point-scan devices that scan along a line or within an area. Speeds are often limited by light-utilization efficiency. Another disadvantage of point-scan techniques is a loss in accuracy due to the sensitivity of such point measurements to environmental conditions, such as vibration of the scanning mechanism. This is because such systems cannot remove changes in height from one point to another point caused by environmental externalities.

BRIEF SUMMARY OF THE DISCLOSURE

The present disclosure may be embodied as a device for surface height profiling. For example, the surface height of a semiconductor wafer can be determined. A source is configured to provide light having a frequency spectrum. The source has a source slit through which the light is provided. The device includes an objective lens having a reference surface. The objective lens is configured to illuminate a sample with test light from the source and to combine test light reflected from the sample with reference light reflected from the reference surface to form combined light. A spectrometer is positioned to receive the combined light at an entrance slit. The spectrometer is configured to image the combined light as a 2-dimensional ("2D") image. The 2D image has a first dimension of wavelength and a second dimension of position along a length of the entrance slit. The device further includes a processor in electrical communication with the spectrometer. The processor is programmed to receive a signal from the spectrometer, the signal representing the 2D image. The processor is further programmed to determine a surface height profile of the sample based on the signal.

In another aspect, the present disclosure may be embodied as a method for surface height profiling. The method includes illuminating a sample using a test light having a frequency spectrum. The test light is shaped as a line having a length. Test light reflected from the sample is combined with a reference light to create a combined light having an interference pattern at light wavelengths according to surface height differences in the sample. The combined light is dispersed into a 2D image. The 2D image has a first dimension of wavelength and a second dimension of spatial position along a length of a line of the combined light. The method includes analyzing a spectrum at a plurality of spatial positions of the 2D image to determine a surface height profile of the illuminated sample.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
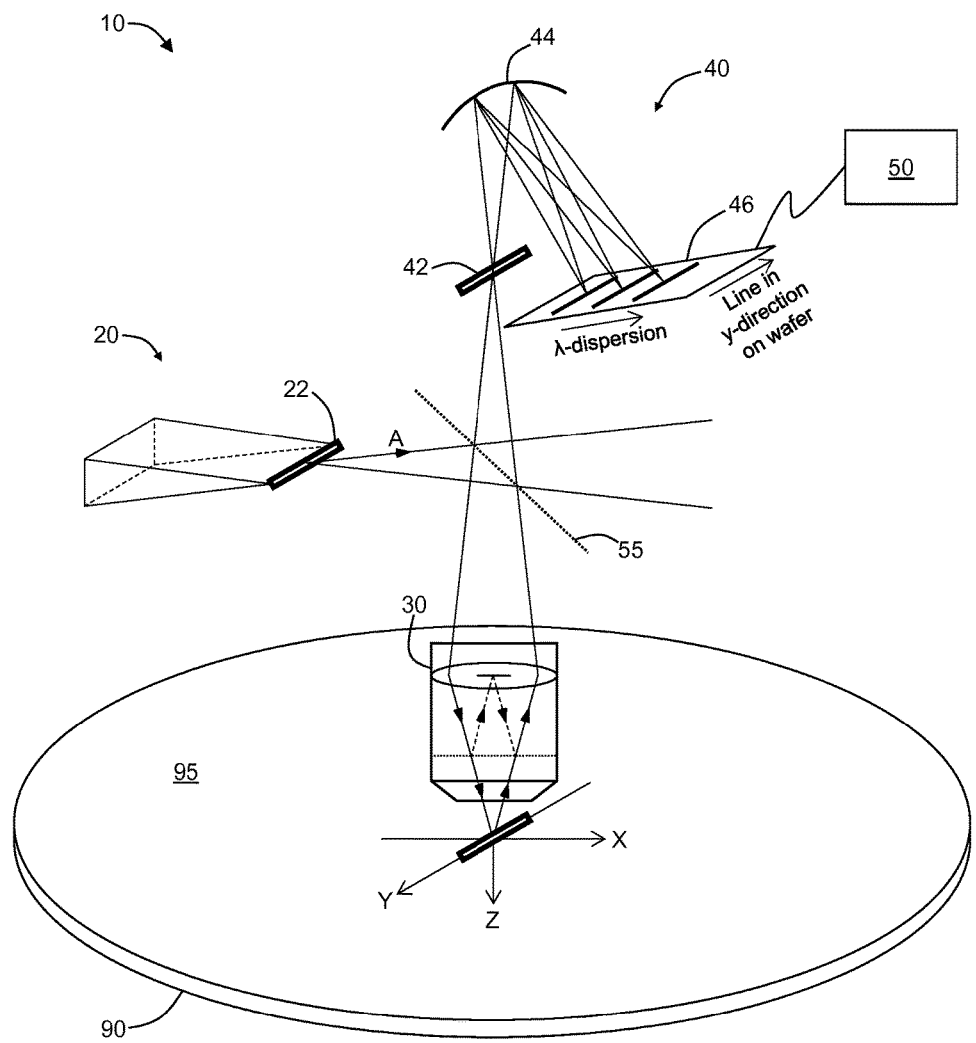
FIG. 1 is a schematic diagram of a device according to an embodiment of the present disclosure.

With reference to FIG. 1, the present disclosure may be embodied as a device 10 for surface height profiling. For example, the device may be used for inspection and/or metrology of a surface 95 of a semiconductor wafer 90. A source 20 is provided. The source 20 is configured to provide light having a frequency spectrum. In some embodiments, the source 20 may be configured to provide a white light (i.e., broadband light in the visible spectrum). For example, the source may comprise a Xenon lamp. Other sources are possible, for example, the light may be partially or completely outside of the visible spectrum. In an exemplary embodiment, the light provided by the source 20 includes wavelengths ($\lambda$) of 280-520 nm.

The source 20 includes a source slit 22 through which the light is provided. Such a source slit 22 may have a first dimension (the "length" of the source slit 22) that is substantially greater than a second dimension (the "width"). In some exemplary embodiments, the source slit 22 may be 1 mm-5 mm in length. For example, in an embodiment, the source slit 22 is 3 mm in length. The width of the source slit 22 is generally sufficiently small that the source slit 22 may be considered to be one-dimensional. For example, the width of the source slit 22 may be similar to a diameter of a point beam in a traditional interferometer. For example, in some embodiments, the source slit 22 may be 5 µm-30 µm in size.

Figure 2:
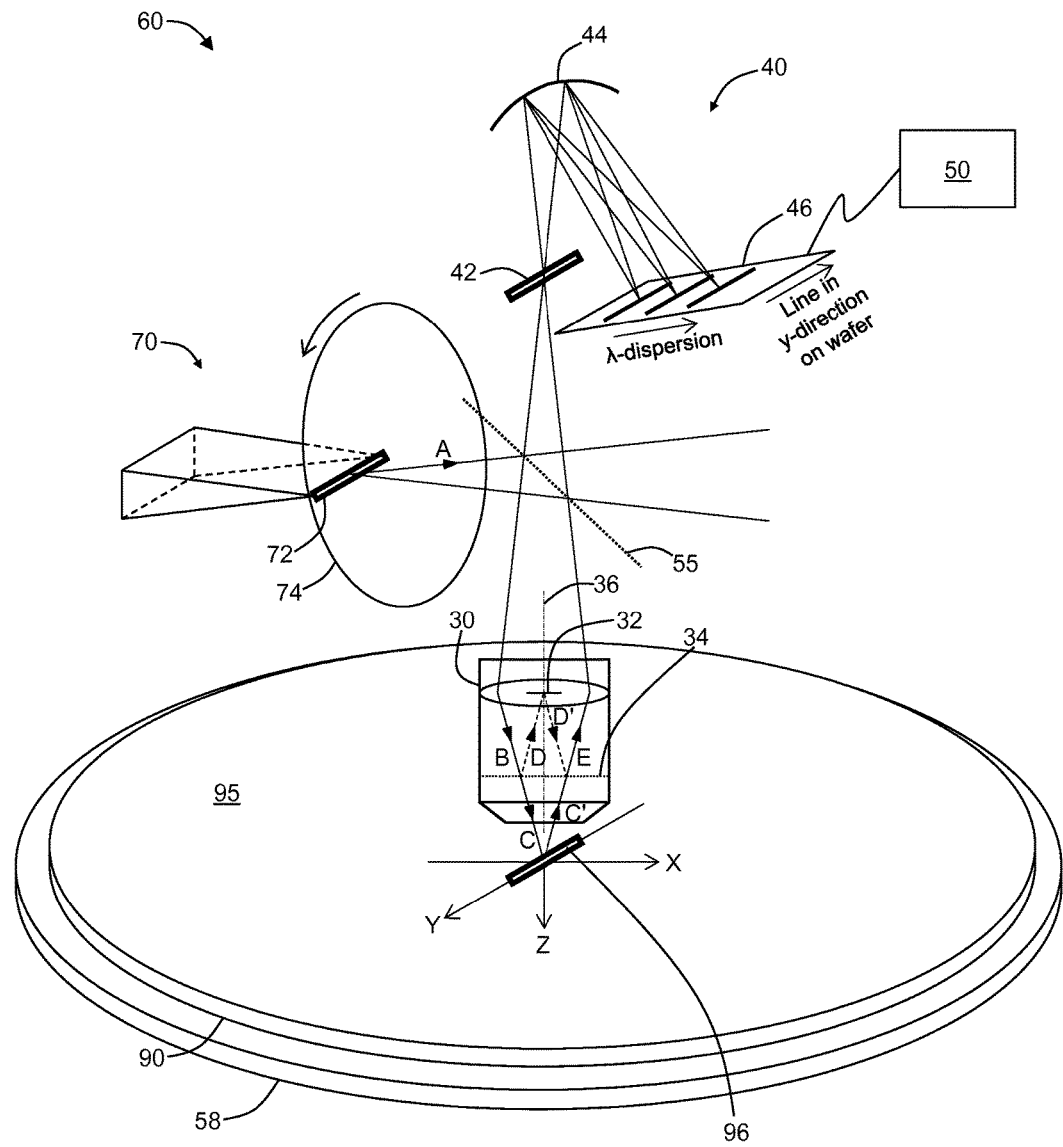
FIG. 2 is a schematic diagram of a device according to another embodiment of the present disclosure.

In some embodiments, such as the embodiment shown in FIG. 2, a device 60 includes a source 70 which comprises an optical chopper 74. Optical choppers (shutters) are known in the art for providing light for a short duration—i.e., flashing (strobing) the light. The optical chopper 74 may be configured such that the source 70 provides light within the device 60 for a duration of less than 100 ms. For example, the optical chopper 74 may be configured such that the source light is provided for 20 ms. The source slit 72 may be disposed in a rotating member of the optical chopper 74. In this way, light from the source 70 is only provided within the device 60 when the source slit 72 is positioned at the source 70. In other embodiments, the source slit is not a part of the optical chopper.

The device 10 further comprises an objective lens 30 having a reference surface 32. The objective lens 30 is configured to receive light ('B' in FIG. 1) from the source 20 via the source slit 22 as described above. A portion of the received light (the "test light" C) passes through the objective 30 and illuminates at least a portion of a sample 96. For example, the sample may be a semiconductor wafer 90. The test light is reflected C' from the sample back to the objective lens 30. Another portion of the received light (the "reference light" D) is reflected from the reference surface 32 and combined with the test light reflected from the sample 96 (C' is combined with D'). The combined light E exits the objective 30. In some embodiments, such as the embodiment depicted in FIGS. 1 and 2, the objective lens 30 is a Mirau objective. Such an objective lens 30 includes a partially reflecting component 34 to split the received light B into test light C and reference light D.

Figure 3:
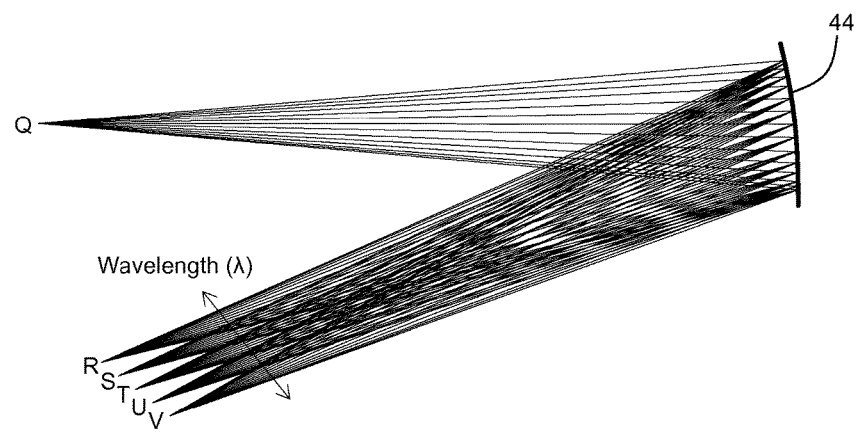
FIG. 3 is diagram showing a functional view of a concave holographic grating.
Figure 4:
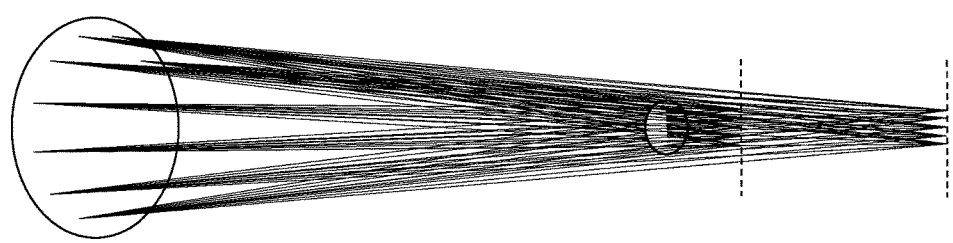
FIG. 4 is a diagram showing a functional view of a concave holographic grating used with a 2D array sensor configuration.

The device 10 further comprises a spectrometer 40. The spectrometer 40 is positioned to receive the combined light E from the objective lens 30. The spectrometer 40 comprises an entrance slit 42 through which the combined light E is received. In some embodiments, the entrance slit 42 is configured to have the same dimensions as the source slit 22. The spectrometer 40 is configured to image the combined light E as a 2-dimensional ("2D") image. In a first dimension, the light of combined light E is dispersed according to wavelength (λ)—so-called "wavelength fan-out." In a second dimension, the combined light E is imaged according to position along a length of the entrance slit 42. In other words, each location within the 2D image represents an intensity of light at a particular wavelength and for a location along the length of the entrance slit 42. To provide the wavelength dispersion, the spectrometer may have a concave holographic grating 44. FIG. 3 is a functional diagram representing how light from a point Q is dispersed (or "fanned-out") by a concave holographic grating 44 such that the light is reflected to several points R-V according to wavelength.

The spectrometer 40 may comprise a 2D detector array 46. In some embodiments, such an array 46 may be a CCD array. In this way, the dispersed light, for example, from the concave holographic grating 44, can be received at the detector array 46 and converted to an electrical signal.

The device 10 may comprise an element 55 for directing at least a portion of the light A from the source 20 to the objective lens 30 and at least a portion of the combined light E from the objective lens 30 to the spectrometer 40. The element 55 may be, for example, a partially reflective mirror as depicted in FIGS. 1 and 2.

The device 10 includes a processor 50 in electrical communication with the spectrometer 40. The processor 50 is configured to receive a signal from the spectrometer 40, for example, from the detector array 46. As described above, the electrical signal represents the 2D image. The processor 50 is programmed to determine a surface height profile of the sample 96 based on the signal. For example, the processor 50 may be programmed to determine a surface height profile by determining a surface height at a plurality of positions along the length of the entrance slit based on interference in the combined light at one or more wavelengths.

In particular, unlike traditional point-scan spectroscopic devices, the present device 10 illuminates the sample 96 with a line (instead of a point) of light, and the line can be imaged on to the entrance slit 42 of a specialized spectrometer 40. The spectrometer 40 images each location on the length of the entrance slit 42 as a shape line—each point on the shape line corresponding to a wavelength. For each spectrum (i.e., the image of any given point of entrance slit 42 dispersed into wavelengths), is processed using known techniques to determine a height value of the point. After all of the spectra are processed (the spectrum for each point on the entrance slit 42), the height value of all points along the entrance slit 42 is obtained as the surface height profile.

The device 10 may further comprise a stage 58 configured to position the sample 96 to receive the test light C, where the device 10 is arranged to scan the sample 96 by translating the stage 58 in a plane which is perpendicular to an optical axis 36 of the objective lens 30. In particular, it should be noted that the presently disclosed device 10 may determine a surface height profile without scanning in the z direction, although the stage 58 may be capable of movement in the z direction for other purposes.

In some embodiments where the sample is scanned to image the entire sample line-by-line, an offset can be calculated from the surface height profile and previous line information. This offset calculation is possible because the height of each point on the scanned line is determined at essentially the same moment in time. Such an offset can be used to remove environmental factors, such as vibration, which may have caused a variance in the optics-to-sample distance during the sampling period for a position on the sample. This offset determination cannot be done for point-scan systems because the point does not include enough data to determine the offset from one point to another. As such, the accuracy of the presently-disclosed device is greatly improved in comparison to point-scan previous inspection techniques.

Improved robustness against environmental factors is also provided by using a short duration light for inspection, for example, by use of the optical chopper as described above. Such a configuration will remove smearing at image fringes caused by environmental instability during data integration time. Additionally, short duration illumination allows improved spatial resolution as the sample is moved (scanned) perpendicularly to the illumination line.

In an exemplary embodiment, the 2D image may comprise 512 wavelengths in the first dimension and 1024 spatial points in the second dimension. If the spectra cover light wavelengths of 450-650 nm over the 512 pixel dispersion, a spectral resolution of less than ~0.8 nm (full-width at half maximum—"FWHM") can be achieved. As such, a maximum particle or bump height, or the dynamic range of the device can be ≈(550*550/0.8)/2 nm≈190 μm, which is well suited to semiconductor inspection applications.

If such an image can be read-out and analyzed at, for example, 2,000,000 lines per second, then 1024×2000 points can be measured per second essentially without overhead causing delay in moving the stage from location to location. In some embodiments, the speed can be further improved by reading out and processing partial frames of images. For example, processing 256 spatial points by 512 wavelengths by 128 scanned lines for each patch image.

Figure 5:
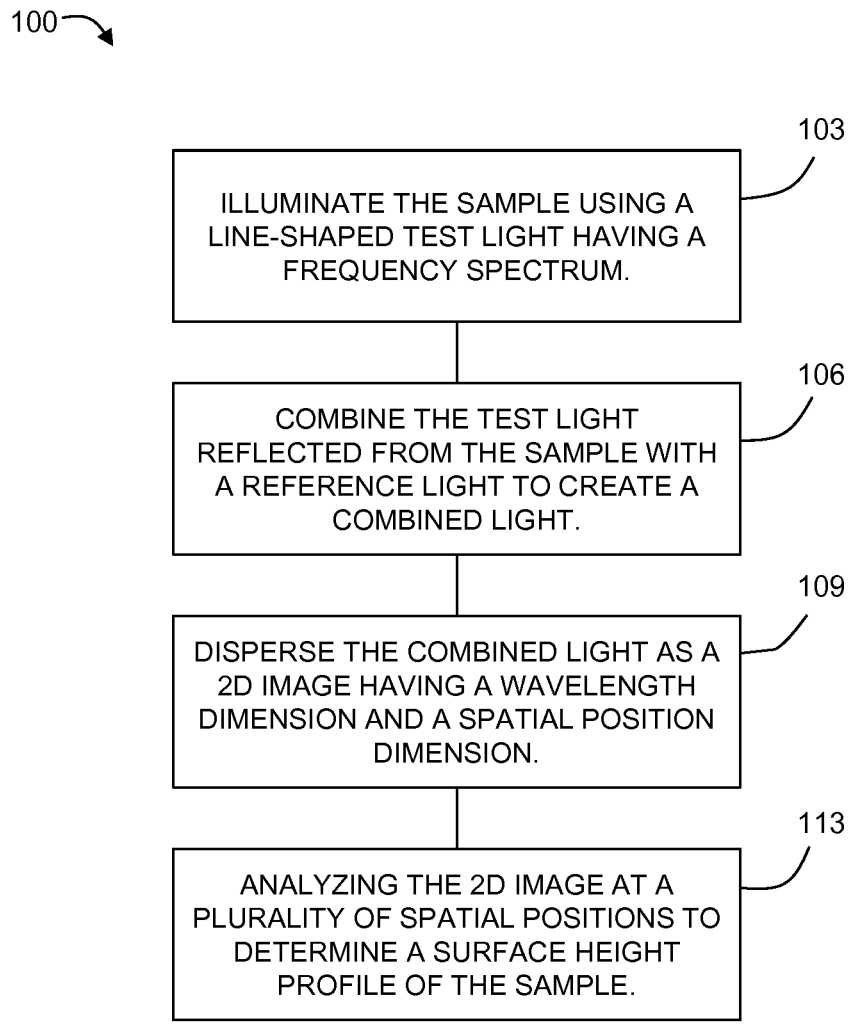
FIG. 5 is a chart showing a method according to another embodiment of the present disclosure.

With reference to FIG. 5, the present disclosure can be embodied as a method 100 for surface height profiling. The method 100 includes illuminating 103 a sample using a test light. The sample can be, for example, a semiconductor wafer. The test light is shaped as a line by, for example, the use of a source slit as described above. The test light used to illuminate 103 the sample has a frequency spectrum. In other words, the test light comprises a broad wavelength of light. For example, the test light may be a "white light." In a particular example, the test light comprises light having wavelengths from 280-520 nm.

The method 100 includes combining 106 the test light (reflected from the sample) with a reference light to create a combined light. Generally, the reference light will be obtained from the same source as the test light such that the combined light has an interference pattern at light wavelengths according to surface height differences in the sample. This combined light is then dispersed 109 into a 2D image. The 2D image has a first dimension which is wavelength (λ) and a second dimension that is spatial position along a length of a line of the combined light (e.g., via an entrance slit, as described above, generally corresponding to the source slit). For example, the combined light may be dispersed 109 (fanned-out) onto a 2D detector array.

The 2D image is analyzed 112 to determine a surface height profile of the sample illuminated by the test light. The 2D image is analyzed 112 by analyzing a spectrum at each of a plurality of spatial positions of the 2D image. For example, a spectrum of 512 wavelengths of light can be analyzed at each of 256 spatial positions along the combined light line by using a processor in communication with a 2D detector array. At each spatial position, the interference pattern(s) at different wavelengths will indicate the surface height of a corresponding spatial position of the sample being illuminated by the test light. In this way, a surface height profile of the illuminated portion of the sample can be determined as comprising the determined surface heights at spatial positions of the illuminated portion.

As will be appreciated from the above description, the presently-disclosed techniques are based on a spectroscopic approach, while advantageously avoiding the need for a z-direction scan mechanism. Light utilization efficiency is also improved. The techniques also provide improved capabilities to avoid problems created by the measurement environment. The present device has much improved throughput over previous techniques because mechanical scans in the z-direction are avoided as well as, the need for a stabilizing period after the sample is moved to a new measurement site.

The presently disclosed technique also has large dynamic range, which is very practical for 0-190 μm height resolution range. A larger range is feasible by the use of longer wavelength light (scaled to wavelength square and inversely to spectrometer spectra resolution). Advantageously, there is no speed penalty for a larger dynamic range in this manner.

Although the present disclosure has been described with respect to one or more particular embodiments, it will be understood that other embodiments of the present disclosure may be made without departing from the spirit and scope of the present disclosure.

What is claimed is:

1. A device for surface height profiling, comprising:
a source configured to provide light having a frequency spectrum, the source having a source slit through which the light is provided;
an objective lens having a reference surface inside the objective lens, the objective lens configured to illuminate a sample with test light from the source and to combine test light reflected from the sample with reference light reflected from the reference surface to form combined light, wherein the reference surface is not on an outer surface of the objective lens that receives the test light reflected from the sample;
a spectrometer positioned to receive the combined light at an entrance slit, the spectrometer configured to image the combined light as a 2-dimensional ("2D") image, wherein a first dimension is wavelength, and a second dimension is position along a length of the entrance slit; and
a processor in electrical communication with the spectrometer, the processor programmed to receive a signal from the spectrometer, the signal representing the 2D image, and to determine a surface height profile of the sample based on the signal.

2. The device of claim 1, wherein the spectrometer comprises a 2D detector array for converting the 2D image into an electrical signal.

3. The device of claim 2, wherein the spectrometer further comprises a concave holographic grating for dispersing the received combined light.

4. The device of claim 1, wherein the objective lens is a Mirau objective.

5. The device of claim 1, wherein the source is configured to provide white light.

6. The device of claim 1, wherein the source is configured to provide light for a duration of time which is less than 100 milliseconds.

7. The device of claim 6, wherein the source comprises an optical chopper.

8. The device of claim 7, wherein the source slit is disposed in the optical chopper.

9. The device of claim 1, further comprising an element for directing at least a portion of the light from the source to the objective lens and at least a portion of the combined light from the objective lens to the spectrometer.

10. The device of claim 9, wherein the element is a partially reflective mirror.

11. The device of claim 1, wherein the processor determines a surface height profile by determining a surface height at a plurality of positions along the length of the entrance slit based on interference in the combined light at one or more wavelengths.

12. The device of claim 1, further comprising a stage configured to position the sample to receive the test light, where the system is arranged to scan the sample by translating the stage in a plane which is perpendicular to an optical axis of the objective lens.

13. A method for surface height profiling, comprising:
illuminating a sample using a test light, wherein the test light is shaped as a line having a length, and wherein the test light has a frequency spectrum;
combining the test light reflected from the sample with a reference light to create a combined light having an interference pattern at light wavelengths according to surface height differences in the sample, wherein the reference light is formed using an objective lens having a reference surface inside the objective lens and not on an outer surface of the objective lens that receives the test light reflected from the sample;
dispersing the combined light into a 2-dimensional ("2D") image, wherein the 2D image has a first dimension of wavelength and a second dimension of spatial position along a length of a line of the combined light; and
analyzing a spectrum at a plurality of spatial positions of the 2D image to determine a surface height profile of the illuminated sample.

\* \* \* \* \*